Nov. 27, 1945.  E. F. ALLEN  2,389,947
VALVE
Original Filed Dec. 7, 1942  4 Sheets-Sheet 2
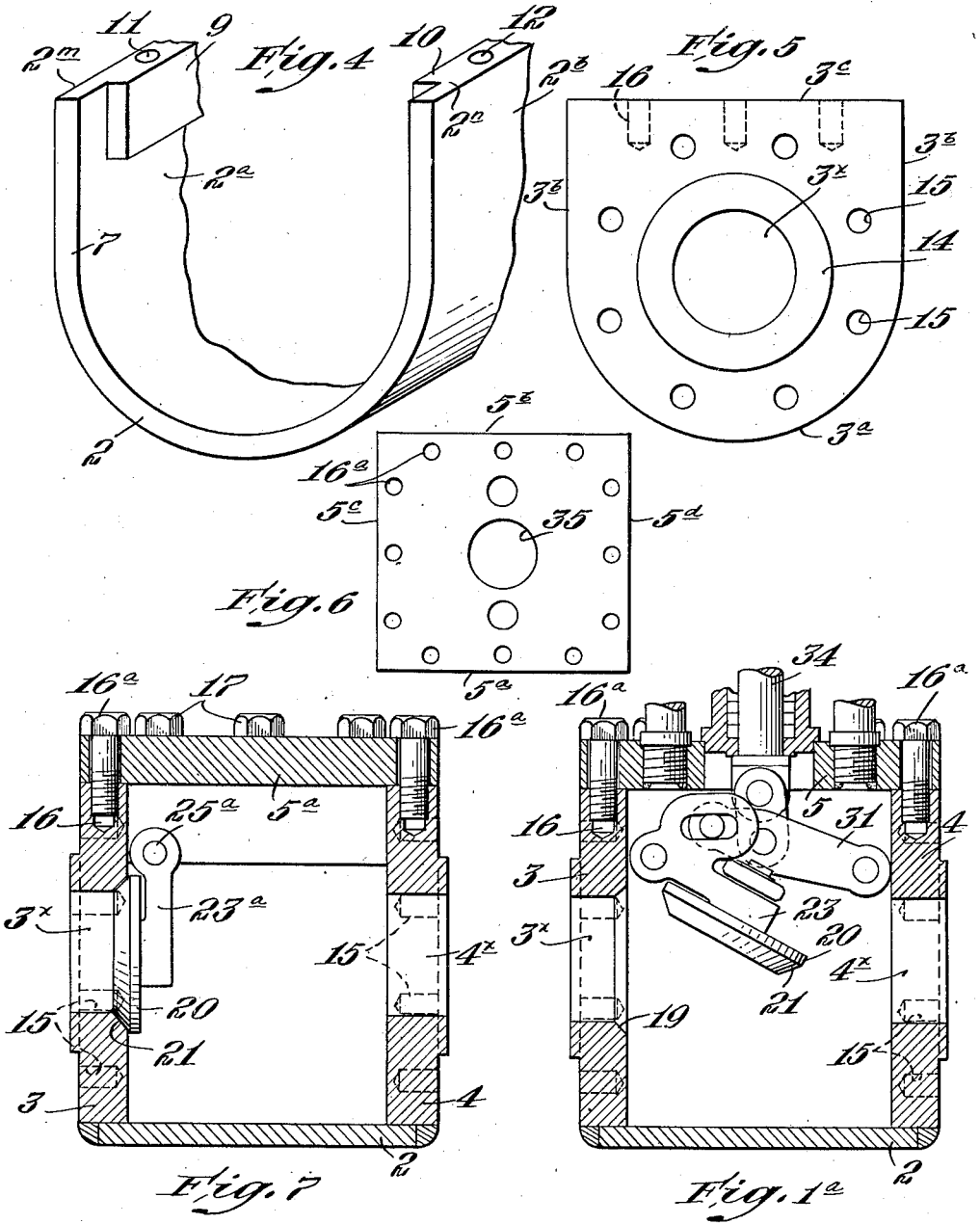

Nov. 27, 1945.  E. F. ALLEN  2,389,947

VALVE

Original Filed Dec. 7, 1942   4 Sheets-Sheet 3

Inventor
Earle F. Allen
by Roberts Cushman & Grover
Att'ys.

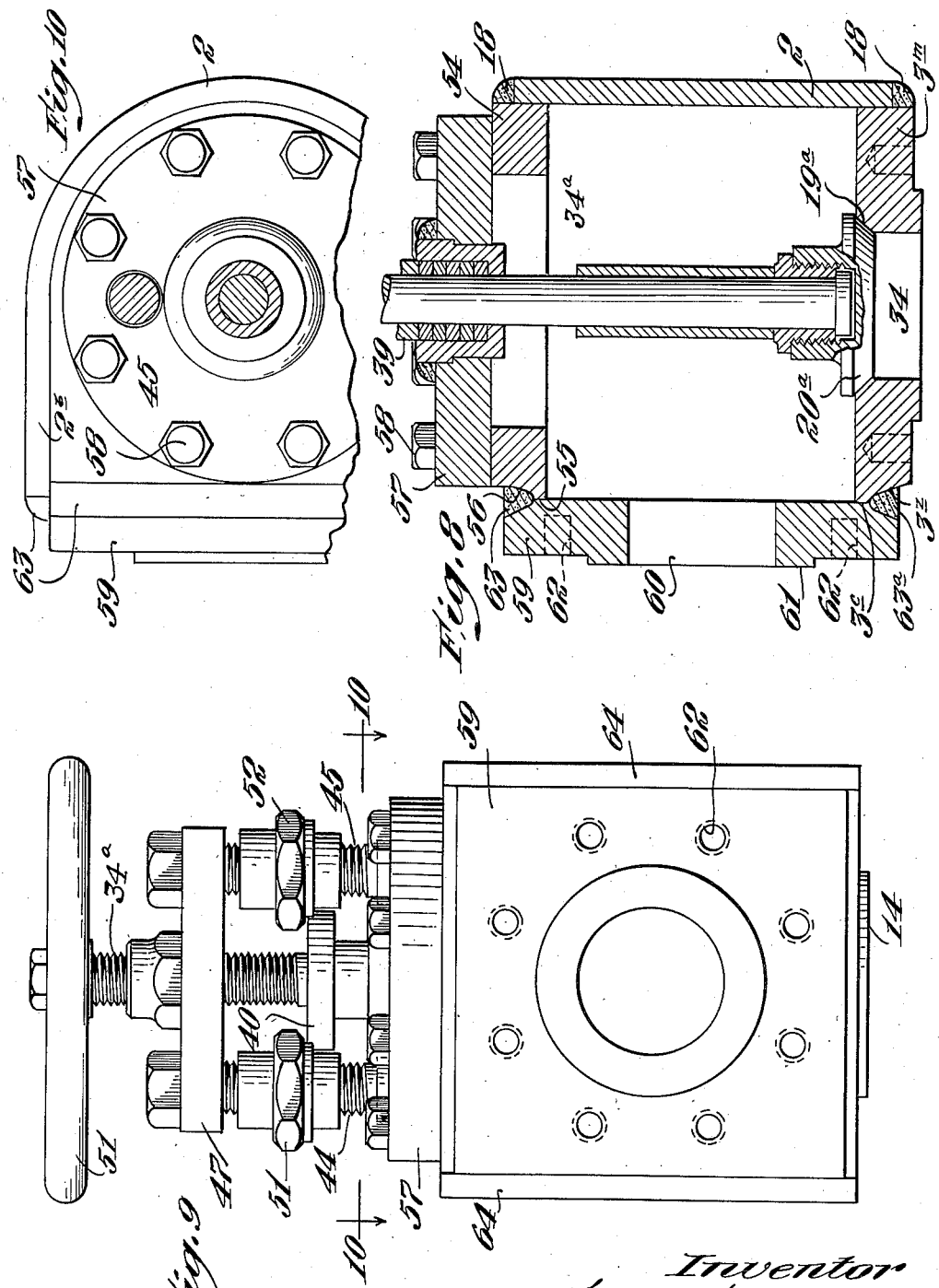

UNITED STATES PATENT OFFICE 2,389,947

VALVE

Earle F. Allen, Wellesley Hills, Mass., assignor to Manning, Maxwell & Moore, Incorporated, New York, N. Y., a corporation of New Jersey Original application December 7, 1942, Serial No. 468,065, now Patent No. 2,373,001, dated April 3, 1945. Divided and this application December 29, 1944, Serial No. 570,434

9 Claims. (Cl. 251—156)

This invention pertains to valves such as are employed for controlling the flow of fluid through pipes or conduits, and relates more particularly to an improved valve casing, the present application being a division of co-pending application for Letters Patent Serial No. 468,065, filed December 7, 1942 and upon which Patent No. 2,373,001 issued April 3, 1945.

Commonly, valve casings are metal castings or forgings. Experience has shown that the walls of such cast or forged valve casings, and their customary attaching flanges, must be made of very substantial thickness in order to insure adequate strength. Thus, such valve casings, when intended for use under modern high pressure and high temperature conditions, must be so heavy that they are difficult to handle and impose an excessive load upon the pipes or other parts to which they are connected; their thick and irregular walls are subject to greatly varying expansion and contraction stresses; and they are massive and occupy an undue amount of space, factors of great importance particularly on shipboard. The operation of casting valve casings of this type is slow and expensive; all such castings and forgings must be finished by machine operations and such operations are sometimes quite difficult to perform; and each of the various types of valve, for instance, globe, gate, check, etc., usually requires a special, individually designed casing, making it necessary for the manufacturer to be prepared (with patterns, jigs, special tools, etc.) to make a wide variety of these casings.

Among the objects of the present invention are to provide a valve casing of relatively light weight as compared with the usual cast or forged casing, but which at the same time has adequate strength; to provide a valve casing in which the walls of the valve chamber are all of sheet metal; to provide a valve casing of such design and whose parts are so assembled as greatly to facilitate all necessary machining operations; to provide a valve casing employing substantially standard parts which may be made to constitute a globe, check, gate or other usual type of valve merely by the selection of the proper parts from among a relatively small number of standard parts and assembling the selected parts to produce the particular type of valve desired.

A further object is to provide a valve casing of minimum weight commensurate with adequate strength, and, in the interest of such weight reduction, to provide a valve casing devoid of the usual attaching flanges but having adequate provision for securing the casing to a pipe or other fluid receptacle or support. A further object is to provide a valve which occupies a minimum of space although of adequate strength and capacity.

Other and further objects and advantages of the invention will be pointed out hereinafter in the following more detailed description and by reference to the accompanying drawings in which Fig. 1 is a vertical section, partly in elevation, on the diametrical plane of the inlet and outlet passages of the valve casing showing the invention embodied in a gate type valve;

Fig. 1ª is a fragmentary section of the valve of Fig. 1 but to smaller scale, showing the valve wide open;

Fig. 4 is a fragmentary perspective view of one of the standard parts employed in accordance with the present invention in constructing valve casings of various types;

Fig. 5 is an elevation of one of the standard end members of the casing;

Fig. 6 is a plan view, to somewhat smaller scale, of a standard bonnet support for use in making such a casing;

Fig. 7 is a section similar to Fig. 1, but to smaller scale, showing the invention embodied in a simple check valve;

Fig. 8 is a fragmentary section similar to Fig. 1 illustrating the invention embodied in a globe type valve;

Fig. 9 is an end elevation of the valve of Fig. 8; and

Fig. 10 is a fragmentary section on line 10—10 of Fig. 9.

Figure 1:
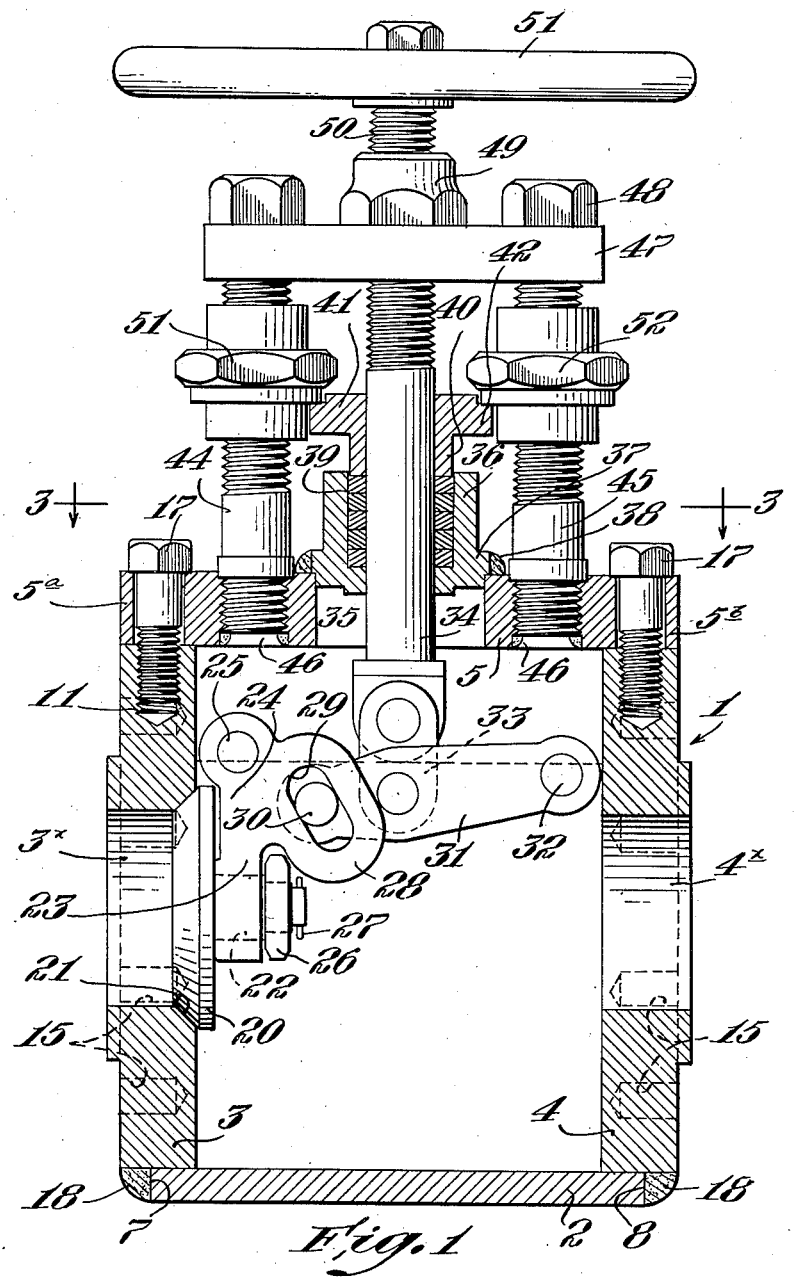
Figure 3:
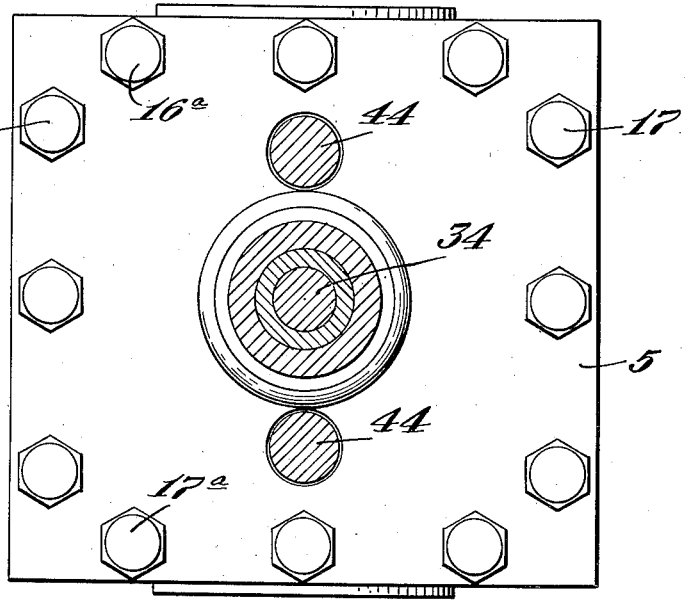
Fig. 3 is a horizontal section substantially on the line 3—3 of Fig. 1.
Figure 2:
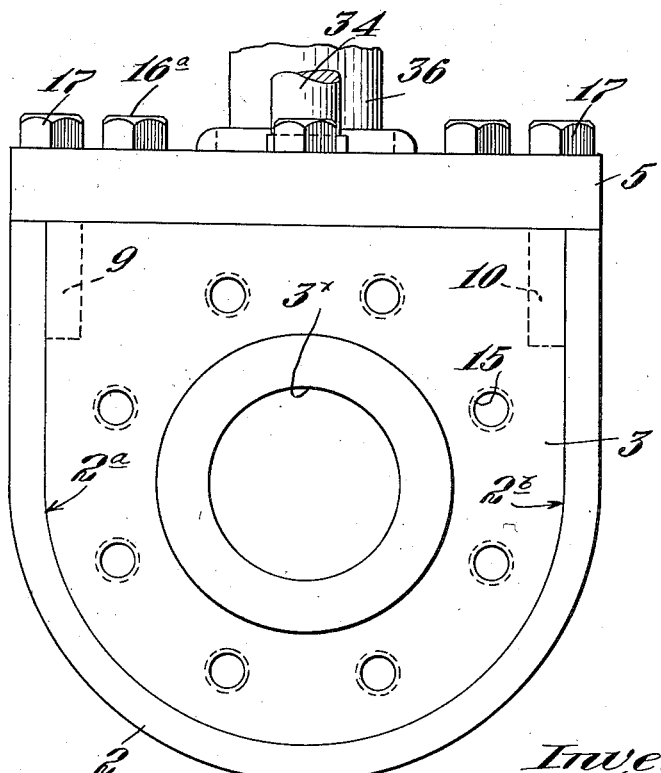
Fig. 2 is a fragmentary end elevation of the valve of Fig. 1.

Referring to the drawings, the numeral 1 designates a valve of gate type embodying the present invention. The casing of this valve, like those of the other types hereinafter described, is of substantially D-shape in a plane perpendicular to the axis of the valve seat (Figs. 2 and 8) and comprises a unitary wall member 2 of substantially U-shape (Fig. 4) consisting of a length of sheet metal bent on a circular arc to form a curved bottom wall and having the substantially parallel leg members 2ª and 2ᵇ designed to form the opposite side walls of the valve casing. The casing also comprises the end members 3 and 4 which may likewise be made of sheet metal but preferably considerably thicker than the wall member 2. These end members 3 and 4 are shaped as illustrated in Fig. 5, each having a curved lower edge 3ᵃ, opposite parallel side edges 3ᵇ and the substantially straight top edge 3ᶜ, the dimensions of these parts being such that they may be fitted within the U-shaped side wall member 2 so as when assembled therewith to occupy the relative positions shown in Fig. 1, whereupon their edges 3ᵃ and 3ᵇ are permanently united to the edges 7 and 8 of the side wall member of Fig. 4 by welding metal indicated at 18 (Fig. 1). The casing also comprises the top member or bonnet support 5 which is likewise of sheet metal of approximately the thickness of the end members 3 and 4, and which is of substantially rectangular contour (Fig. 6) having the substantially straight opposite edges 5ᵃ and 5ᵇ which are spaced apart a distance substantially equal to the distance between the outer surfaces of the leg members 2ᵃ and 2ᵇ of the U-shaped part 2. The part 2 is preferably thickened toward its upper edges 2ᵐ and 2ⁿ by means of blocks 9 and 10, respectively, of metal welded to the inner surfaces of the legs 2ᵃ and 2ᵇ. In the outer edges of these thickened portions of the part 2 there are formed tapped sockets 11 and 12 respectively, which are designed to receive bolts 17 by means of which the member 5 is removably secured to the side wall member 2. The member 5 also has the opposite straight edges 5ᶜ and 5ᵈ (Fig. 6) which are spaced apart a distance substantially equal to the distance between the outer surfaces of the assembled members 3 and 4. Openings are formed along these edges of this top member for the reception of bolts 16ᵃ which enter tapped sockets 16 provided in the upper edges of the end members 3 and 4.

The end members 3 and 4 are furnished with fluid flow apertures or ports 3ˣ and 4ˣ, respectively one of which may be an inlet passage and the other a delivery passage, both communicating with the valve chamber defined by the parts 2, 3, 4 and 5. The members 3 and 4 are provided with finished outer surfaces surrounding the openings 3ˣ and 4ˣ, respectively, such surfaces preferably constituting the outer faces of annular low bosses 14 designed to make leak-tight contact with other parts with which the valve may be associated, for example, with pipe flanges or with flanges or surfaces of fluid containers such, for instance, as a steam generator or the like. The inner surface of the part 3, as illustrated in Figs. 1 and 1ᵃ, is beveled to provide an annular valve seat 19 with which cooperates a valve head or feather 20, having a beveled face 21 for engagement with the seat. This valve head is furnished with a stem 22 which passes through an opening in the arm 23 of a bell crank lever 24 which is pivoted at 25 within the valve chamber. The valve stem may be secured to the arm 23 by means of a nut 26 and cotter pin 27 or by any other suitable means of attachment. The lever 24 is furnished with a second arm 28 having an inclined slot 29 which receives a crank pin 30 projecting from lever 31 pivoted at 32 within the valve chamber. This lever 31 is connected at a point intermediate its ends, by means of a link 33, to the lower end of the valve stem 34. This valve stem extends up through a large central opening 35 in the member 5 and through a stuffing box 36. The stuffing box has a flange 37 which is welded leak-tight at 38 to the member 5. Surrounding the stem 34, within the stuffing box, is a body of compressible packing material 39 which is normally held under compression by means of a gland 40. This gland is provided with a pair of oppositely directed ears 41 and 42 which are normally engaged by nuts 51 and 52 respectively, having threaded engagement with a pair of parallel posts 44 and 45, whose lower ends are screwed into threaded bores in the member 5 and are preferably welded at 46 (Fig. 1) to the member 5. Near their upper ends the posts 44 and 45 carry a bridge member 47 which is held in place by means of nuts 48 at the upper ends of the posts. This bridge member has a central, internally screw-threaded boss or stem-bearing 49 which engages screw threads 50 on the upper portion of the stem 34, the latter having an actuating wheel or handle 51 by means of which it may be turned. Turning the stem 34 swings the lever 31 and by means of the pin 30 and slotted arm 28 moves the valve head 20 toward and from the seat 19. When in fully open position, as shown in Fig. 1ᵃ, the valve head 20 is elevated to such a point within the valve chamber that it does not seriously interfere with the free flow of fluid entering, for example, through the passage 4ˣ and leaving through the delivery opening 3ˣ so that the valve thus constructed constitutes a satisfactory gate valve.

The packing in the stuffing box 36 is of substantial length so as to insure adequate packing of the valve stem, even though the valve be subjected to extremely high pressures. The packing may be compressed by turning the nuts 51 and 52, but if it be desired to retract the packing gland from the stuffing box, it is merely necessary to loosen the nuts 51 and 52 slightly so that the gland may be turned angularly sufficiently to disengage its ears 41 and 42 from the nuts, whereupon the gland may be moved freely upwardly out of the stuffing box without necessitating a long retraction of the nuts relative to the posts 44 and 45.

As illustrated in Fig. 5, the end members 3 and 4 are preferably provided with series of tapped sockets 15 arranged in a circle concentric with the openings 3ˣ and 4ˣ, respectively, such circle being of a radius less than the radius of the curved edges 3ᵃ of the parts 3 and 4. These tapped sockets 15 are designed for the reception of bolts or equivalent fasteners by means of which the casing is secured to other parts, for example to pipe flanges. By this arrangement it is possible to construct the casing without the usual projecting attaching flanges and thus reduce the weight and dimensions of the valve device but without sacrifice of capability to form a snug leak-tight joint between the casing and such other parts as may be associated with it.

While in Figs. 1 and 1ᵃ the valve is illustrated as a valve of gate type, it is very easy to convert this into a simple check valve, as shown in Fig. 7, merely by the use of a plain top plate 5ᵃ (without the post and stem receiving apertures of the plate 5 above described) and attaching the valve head 20 to a simple lever 23ᵃ pivoted at 25ᵃ in the valve chamber.

Obviously, by modification of the valve-actuating connections between the valve head and the stem 34 of Fig. 1, the type and degree of movement imparted to the valve 20 might readily be varied, for example to provide for manual closing and fluid pressure opening of the valve.

In Figs. 8, 9 and 10, the invention is shown as embodied in a globe valve. The wall member 2 is identical with that above described, with the exception that it need not be provided with the screw-threaded sockets 11 and 12. The bottom member $3^m$ may be identical with the end member 3 above described, except that its upper straight edge $3^c$ (Fig. 8) need not have the screw-threaded sockets 16, but instead is beveled as shown at $3^z$. The top member 54, as here illustrated, is of the same general contour as the member 4 above described, but does not have the sockets 16 in its upper edge, its corresponding edge 55 (Fig. 8) being beveled as shown at 56. Furthermore, this member, as here illustrated, has a large central opening to reduce its weight, and surrounding this opening are a series of screw-threaded or tapped sockets for the reception of bolts 58 by means of which the bonnet support 57 may be removably attached to the part 54. The part 54 and the part $3^m$ are permanently secured to the part 2 by welding metal 18. The part 59, corresponding in shape and size to the part 5 above described, is permanently secured to the straight edges of the parts $3^m$ and 54 by welding metal at $63^a$ and 63, respectively. This part 59 is also secured permanently to the upper edges of the legs $2^a$ and $2^b$ of the part 2 by welding metal 64 (Fig. 9). The part 59 is provided with a central aperture 60 constituting one of the fluid flow passages, for example the inlet passage, and its outer face is preferably finished to provide an annular finished surface 61 desirably raised somewhat to form a contact boss. Surrounding this boss 61 is a series of tapped sockets 62 for the reception of bolts by means of which the casing may be attached to another part. The bonnet support 57 is provided with a central opening for the passage of the valve stem $34^a$ whose inner end is secured to the valve head $20^a$, the latter cooperating with the seat $19^a$ surrounding the fluid flow aperture 34 in the part $3^m$. The bonnet support 57 is generally similar in function to the part 5 above described in that it carries parallel posts 44 and 45 constituting part of the bonnet structure, which may be identical with that above described, similar parts being similarly designated.

The above modifications serve to illustrate some of the utilities of the present invention, and in particular the fact that by the use of parts of standardized construction it is possible to build valve casings of various types with a minimum amount of machine work, while at the same time providing casings which are unusually light in weight (in fact as much as 50% lighter than usual valves of similar capacity) and which occupy little space as compared with ordinary forged or cast casings. This reduction in weight is largely attributable to the fact that the casing in accordance with the present invention is made up of pieces of sheet metal. Metal worked into sheet form is admittedly more homogeneous in character, freer from concealed flaws and imperfections, and of greater tensile strength than castings and forgings, and since these sheet metal parts may be molecularly united by welding metal at the joints, it is thus possible to build casings of great strength and which may be depended upon to carry the imposed load without employing so great a factor of safety and thus so great an excess of material as is necessary with usual prior constructions. Not only is less metal thus required in the completed valve, but the amount to be removed by machining is very greatly less than in making valve casings from forgings or castings.

It will be noted that the part 2 as here illustrated is standard for all various types of casing of given size, except for very slight and simple machine operations before assembly; that the members 3 and 4 are likewise substantially standard for various casings; that the member 5 is likewise standard for various types of casing; and that thus by carrying a few standard parts different types of casing may readily be built up to suit varying demands. It will likewise be noted that such machining operations as must be performed may be carried out before assembly of the parts and when the parts are accessible so that the machining operations are simplified and made less expensive.

While certain desirable arrangements have been illustrated, by way of example, it is to be understood that the invention is not necessarily limited to these precise arrangements but is to be regarded as broadly inclusive of any and all modifications falling within the scope of the appended claims.

I claim:

1. A valve device having a casing whose walls are assembled pieces of sheet material, said casing comprising a U-shaped wall member, a top plate and end plates, means molecularly uniting two of said plates to the wall member, one of the plates being removable thereby to permit access to the interior of the casing, at least two of said plates having therein fluid flow apertures, each of the plates, which has a fluid flow aperture therein being provided with sockets in its outer surface for the reception of fasteners for securing the casing to another part.

2. A valve device having a casing consisting of sheet material and including a relatively thin cylindrically curved wall member and relatively thick top and end plates, two of said plates being welded to the wall member and means removably attaching the other plate to the wall member, the welded plates each having therein a fluid flow aperture and sockets for the reception of means for attaching them to another part, the other of said plates having an opening for the passage of a valve-actuating stem.

3. A valve device having a casing comprising a U-shaped wall member, a top plate and end plates, means molecularly uniting two of said plates to the wall member, one of the plates being removable thereby to permit access to the interior of the casing, at least two of said plates having therein fluid flow apertures, each plate which has a fluid flow aperture therein being provided with a plurality of tapped sockets arranged concentrically about its aperture for the reception of bolts by means of which the casing may be attached to another part.

4. A valve device having a casing consisting of sheet material and including a relatively thin substantially U-shaped wall member, the leg portions of said wall member having thickened ends provided with tapped sockets leading inwardly from their outer edges, a top plate engaging said outer edges of the wall member, bolts passing through the top plate into said tapped sockets thereby to secure the top plate in operative position, and end plates welded to the wall member at the opposite edges thereof, thereby, with the top plate and wall member, to define a valve chamber, said end plates having aligned fluid flow apertures.

5. A valve device having a casing whose walls are assembled pieces of sheet material, said casing comprising a U-shaped wall member, a top plate and end plates, means molecularly uniting two of said plates to the wall member, one of the plates being removable thereby to permit access to the interior of the casing, at least two of said plates having therein fluid flow apertures, each plate which has a fluid flow aperture being provided at its outer surface with an annular boss for contact with another part and having means for removably securing said plate to said other part.

6. A valve device having a casing of substantially D-shape in vertical section, the casing comprising a U-shaped wall member, a top plate, means removably securing the top plate to the end edges of the parallel legs of said wall member, end plates molecularly united to said wall member at opposite side edges thereof respectively, each of said end plates having therethrough a fluid flow aperture, a valve seat coaxial with one of said apertures, and a bonnet structure carried by the top plate, said bonnet structure comprising guides for a valve-actuating stem.

7. A valve device having a casing of substantially D-shape in vertical section, the casing comprising a U-shaped wall member, a top plate, means removably securing the top plate to the end edges of the parallel legs of said wall member, end plates molecularly united to said wall member at opposite side edges thereof respectively, one of the end plates and the top plate having therein fluid flow apertures, a valve seat coaxial with the fluid flow aperture in said end plate, the other end plate having therein an aperture for the passage of a valve stem and carrying a bonnet structure, said bonnet structure comprising guide means for a valve-actuating stem.

8. A valve device having a hollow casing which houses a valve seat, the casing being substantially D-shape in a plane parallel to the plane of the valve seat, the casing being of sheet material and including a relatively thin, U-shaped wall member and three substantially flat plates of relatively thicker material, two of said plates being of substantially D-shape in contour and the third plate being substantially rectangular, the latter plate closing the open end of the U-shaped wall member, the D-shaped plates being parallel and perpendicular to the rectangular plate and engaging the opposite edges respectively of the U-shaped wall member, two at least of the plates being welded to the wall member and being provided with fluid flow apertures, one of said latter plates having a valve seat coaxial with its fluid flow aperture, each of the latter plates having sockets for the reception of means for attaching the casing to another part, and the third plate having therein an opening for the passage of a valve-actuating stem.

9. A valve device having a hollow casing which houses a valve seat, the casing being substantially D-shaped in a plane parallel to the plane of the valve seat, the casing being of sheet material and including a relatively thin U-shaped wall member and three relatively thick flat plates, all of said plates being welded to the wall member, the first of said plates closing the open end of the U-shaped wall member and the other plates engaging the opposite edges respectively of the U-shaped member, the aforesaid first plate and one of the other plates being provided with fluid flow apertures and with sockets for the reception of fastening means for uniting the casing to another part, one of said apertured plates having a valve seat coaxial with its fluid flow aperture, the third of said plates having an aperture for the passage of a valve-actuating stem, and a bonnet support removably secured to said third plate.

EARLE F. ALLEN.